United States Patent [19]

Kobayashi et al.

[11] Patent Number: 5,145,657
[45] Date of Patent: Sep. 8, 1992

[54] METHOD FOR PURIFICATION OF GAS

[75] Inventors: Motonobu Kobayashi; Kiichiro Mitsui, both of Hyogo; Yoku Nanba, Osaka; Toshihide Kanzaki; Kunio Sano, both of Hyogo; Takehiko Suzuki, Shiga; Akira Inoue, Osaka, all of Japan

[73] Assignee: Nippon Shokubai Kagaku Kogyo Co., Ltd., Osaka, Japan

[21] Appl. No.: 684,983

[22] Filed: Apr. 15, 1991

Related U.S. Application Data

[63] Continuation of Ser. No. 549,828, Aug. 9, 1990, abandoned, which is a continuation-in-part of Ser. No. 181,449, Apr. 14, 1988, abandoned.

[30] Foreign Application Priority Data

Jan. 21, 1987 [JP] Japan .................................. 62-10008
Jan. 22, 1987 [JP] Japan .................................. 62-11247

[51] Int. Cl.$^5$ ...................... C01B 13/00; C01B 17/16; C01C 3/00; C10H 23/00
[52] U.S. Cl. ..................... 423/219; 423/230; 423/237; 423/245.1; 423/245.3
[58] Field of Search ............. 423/245.1, 245.3, 219, 423/230, 242 A, 242 R, 239, 239 A, 237

[56] References Cited

U.S. PATENT DOCUMENTS 4,173,549 11/1979 Keut et al. .................. 423/219 X

FOREIGN PATENT DOCUMENTS 53-87972 8/1978 Japan ................................ 423/219
2056424 3/1981 United Kingdom ............. 423/219

*Primary Examiner*—Gregory A. Heller
*Attorney, Agent, or Firm*—Omri M. Behr

[57] ABSTRACT

A catalyst for the purification of a gas containing ozone or a component of offensive odor is composed of (A) a composite oxide comprising (a) titanium and (b) at least one element selected from the group consisting of Si, Zr, and P and (B) at least one element selected from the group consisting of Mn, Fe, Co, Ni, Ag, Pt, Pd, and Rh.

10 Claims, No Drawings

METHOD FOR PURIFICATION OF GAS

This application is a continuation of application Ser. No. 07/549,828, filed Aug. 9, 1990, now abandoned, which is a continuation-in-part of 181,499, filed Apr. 14, 1988, now abandoned.

BACKGROUND OF THE INVENTION

1. Field of the Invention

This invention relates to a method for the purification of a gas and a catalyst for use in the purification. More particularly, it relates to a method for catalytically decomposing ozone contained in a gas or catalytically decomposing a component of offensive odor in a gas through oxidation with ozone and to a catalyst used for the decomposition.

2. Description of the Prior Art

Ozone possesses a strong oxidizing ability and, on decomposition, converts itself into harmless oxygen. Thus, it has found extensive utility in various applications aimed at deodorizing, sterilizing, and bleaching various substances and even lowering the COD level of plant effluents. Unfortunately, since part of the ozone so used in varying treatments is released in its unaltered form into the air, the stray ozone has the possibility of giving rise to secondary environmental pollution such as, for example, generation of a photochemical smog. In the case of an airplane in flight through the stratosphere, since the air containing ozone is drawn into the interior of the airplane, the passengers and the crew aboard the airplane may possibly be exposed to the adverse effect of the ozone in the air.

Further, the issue of ozone from machines incorporating therein various high voltage generating devices such as, for example, xerographic copying machines has recently been posing a problem. Since these machines are installed mainly in rooms, the ozone so generated pollutes the interiors of the rooms, though the amount of the ozone so generated is very small.

The odor of ozone can be perceived even when the ozone is present in a concentration of not more than 1 ppm. When ozone is present in the air in a concentration exceeding 2 ppm, it stimulates the respiratory system of a person inhaling the air and does harm to the person's body. The air which contains the ozone issuing from a varying ozone sources must be detoxified by removal of the ozone.

As conventional techniques used for disposal of spent ozone, the method using activated carbon, the method using a liquid detergent, and the method resorting to thermal decomposition have been available When the activated carbon method is utilized for the treatment of air containing ozone in a low concentration, the activated carbon must be replenished as it is consumed in consequence of progress of the decomposition of ozone. When this method is used for the treatment of air containing ozone in a high concentration, the activated carbon must be handled attentively because it has the possibility of being ignited and burnt by the heat of reaction.

The liquid detergent method resides in purifying air containing spent ozone with the aqueous solution of a reducing substance. Thus, the treatment costs much and gives rise to a problem of waste water disposal.

The thermal decomposition method has the disadvantage that it requires application of heat to a temperature of not less than 300° C. for the purpose of enhancing the efficiency of decomposition, necessitates an expensive application of heat for the disposal of a large volume of waste gas, and engenders a high cost of treatment.

In recent years, as one approach to the disposal of spent ozone, the method which resorts to catalytic decomposition has been the subject of research. It is held that this method constitutes an advantageous way of removing ozone by decomposition at a low cost because it has no possibility of inducing ignition or explosion and obviates the necessity for waste water disposal.

Regarding the decomposition of ozone, a catalyst using the oxides of nickel, manganese, cobalt, etc. is disclosed as exhibiting an outstanding ability to effect efficient decomposition of ozone in the specification of Japanese Patent Laid-Open SHO 60(1985)-97,049. For practical reasons, however, the necessity for developing a catalyst exhibiting high activity in the range of much lower temperatures has been finding growing recognition.

In recent years, the pollution of air with offensive odor has arisen as a serious social problem and thus the need for development and adoption of new techniques for combatting such odors.

Heretofore, deodorization of foul air has been carried out by the method of washing with a detergent, the method of adsorption, the method of direct combustion, the method of catalytic combustion, the method of oxidation with ozone, etc. These methods invariably have both merits and demerits of their own and leave much to be desired. The detergent method yields a large volume of waste water and incurs a large cost for the disposal of waste water. The adsorption method which mostly uses activated carbon as an adsorbent has the disadvantage that devices such as for replacement of activated carbon are difficult to maintain because the adsorbent is liable to catch fire and is quickly deprived of the deodorizing effect. The direct combustion method requires to use fuel and, therefore, entails a high running cost, demands a careful consideration on safety of operation, and suffers a great expense for a voluminous plant. In the case of the catalytic combustion method, though the plant can be maintained relatively easily, the temperature of the catalyst bed must be maintained in the range of 300° to 450° C. When the gas to be treated has a low temperature or the flammable substance is present in a low concentration, therefore, this method suffers from the disadvantage that the running cost is inevitably high. The ozone oxidation method effects elimination of a component of offensive odor by making use of the powerful oxidizing action of ozone. Since this method effects the treatment at a low temperature in the neighborhood of normal room temperature, it enjoys a low operating cost as compared with the various methods mentioned above Since the reaction of ozone with the component of offensive odor in the gaseous phase proceeds slowly, this method necessitates adoption of a long and voluminous reactor The method further suffers from the disadvantage that the unaltered portion of ozone is released into the atmosphere possibly to induce secondary air pollution.

Two new methods have been proposed as means of overcoming the aforementioned drawbacks of the various conventional methods The first method effects deodorization of a foul gas by the use of an apparatus provided with an ozone generator and an ozone decomposition filter (Japanese Patent Laid-Open SHO 61(1986)-29,358.)

This method has no possibility of causing secondary air pollution because the unaltered portion of ozone is forcibly decomposed before it is released into the atmosphere. Since both the unaltered portion of ozone and the component of offensive odor are decomposed in the gas phase, the reactor to be used is required to possess a large capacity for the reason mentioned above. If the reactor has a small capacity, there ensues the disadvantage that no sufficient deodorizing effect is obtained because the foul gas under treatment passes the ozone decomposition filter before it is thoroughly deodorized.

The second method resides in using a catalyst for the purpose of accelerating the reaction of ozone with the component of offensive odor thereby ensuring thorough oxidation of the component of offensive odor and, at the same time, effecting catalytic decomposition of the unaltered portion of ozone.

As catalysts available for this method, a catalyst having a metal oxide deposited on a carrier made of a carbonaceous material (Japanese Patent Laid-Open SHO 54(1979)-119,371) and a catalyst having a metal oxide deposited on a carrier of activated alumina (Japanese Patent Laid-Open SHO 53(1978)-30,978) have been disclosed.

In the case of the former catalyst, the carrier is consumed by the combustion of carbon with ozone and the carrier possesses such a large adsorbing capacity as to adsorb the product of oxidation and, as an inevitable result, the catalyst suffers from rapid deterioration and fails to offer an adequate service life.

The latter catalyst cannot be expected to offer an adequate service life because sulfur compounds (such as methyl mercaptan and hydrogen sulfide) which are representative ingredients of the component of offensive odor are oxidized into $SO_3$ and this product of oxidation is deposited cumulatively on the active alumina of the carrier.

As described in detail above, with the conventional methods, it is difficult to attain deodorization to a thorough extent and effect substantial elimination of the leakage of the unaltered ozone into the atmosphere.

An object of this invention, therefore, is to provide a novel method for the purification of a gas and a catalyst to be used therefor.

Another object of this invention is to provide for catalytic decomposition of ozone contained in a gas into oxygen, an inexpensive ozone decomposition catalyst having excellent low-temperature activity and ability to remove the offensive odor component of a gas by catalytic oxidative decomposition of the said component with ozone, a method for inexpensive deodorization capable of producing a stable and efficient deodorizing effect over a long period and substantially eliminating release of the unaltered portion of ozone into the atmosphere.

SUMMARY OF THE INVENTION

There is provided a catalyst for the purification of a gas, comprising a component A composed of a composite oxide containing (a) titanium and (b) at least one element selected from the group consisting of silicon, zirconium, and phosphorus. The objects are also accomplished by a catalyst for the purification of a gas, comprising a component A composed of a composite oxide containing (a) titanium and (b) at least one element selected from the group consisting of silicon, zirconium, and phosphorus and a component B composed of at least one element selected from the group consisting of manganese, iron, cobalt, nickel, silver, platinum, palladium, and rhodium, wherein the amount of the component B is a proportion in the range of not more than 150 parts by weight as oxide, where the element selected is manganese, iron, cobalt, nickel, or silver or in the range of not more than 10 parts by weight as metal where the element is platinum palladium, or rhodium repectively based on 100 parts by weight of the component A as oxide.

The objects are also accomplished by passing an ozone-containing gas through a bed of the catalyst.

These objects are further accomplished by continuously adding ozone to a gas containing a component of offensive odor and passing the resulting mixed gas through a bed of the catalyst.

In the removal of a component of offensive odor from a gas containing the offensive odor component by introduction of ozone into the gas and consequent decomposition of the offensive odor component, the objects mentioned above are accomplished by setting up a catalyst bed in a path for the flow of the gas and intermittently introducing ozone into the gas flowing through the catalyst bed.

In accordance with this invention, the catalyst bed brings about desirable results when, as the catalyst for the bed, there is used a catalyst which comprises a component A composed of a composite oxide containing (a) titanium and (b) at least one element selected from the group consisting of silicon, zirconium, and phosphorus and a component B composed of at least one element selected from the group consisting of manganese, iron, cobalt, nickel, silver, platinum, palladium, and rhodium, wherein the amount of the component B is a proportion in the range of not more than 150 parts by weight as oxide where the aforementioned element selected is manganese, iron, cobalt, nickel, or silver or in the range of not more than 10 parts by weight as metal where the aforementioned element is platinum, palladium, or rhodium repectively based on 100 parts by weight of the component A as composite oxide.

Alternatively, 5 to 90% by weight of the component A in the catalyst may be substituted with an activated carbon.

The catalyst of the present invention is such that the oxide of the component A thereof exhibits an outstanding ability to effect ozone decomposition and deodorization at low temperatures not exceeding 60 ° C. and the catalyst obtained by addition of the component B to the component A manifests high activity in the ozone decomposition and the deodorization at extremely low temperatures in the range of −10 to 25° C.

DESCRIPTION OF PREFERRED EMBODIMENT

The catalyst contemplated by the present invention is characterized by using as a catalytic component thereof a binary composite oxide comprising titanium and silicon (hereinafter referred to as "$TiO_2$—$SiO_2$"), a binary composite oxide comprising titanium and zirconium (hereinafter referred to as "$TiO_2$—$ZrO_2$"), a binary composite oxide titanium and phosphorus comprising titanium and phosphorus (hereinafter referred to as "$TiO_2$—$P_2O_5$"), a ternary composite oxide comprising titanium, silicon, and zirconium (hereinafter referred to as "TiO —$SiO_2$—$ZrO_2$"), a ternary composite oxide comprising titanium, silicon, and phosphorus (hereinafter referred to as "$TiO_2$—$SiO_2$—$P_2O_5$"), a ternary composite oxide comprising titanium, zirconium, and phosphorus (hereinafter referred to as "$TiO_2$—$ZrO_2$—P-

$_2O_5$"), or a quaternary composite oxide comprising titanium, silicon, zirconium, and phosphorus (hereinafter referred to as "$TiO_2$—$SiO_2$—$ZrO_2$—$P_2O_5$")(component A).

Generally, the binary composite oxide comprising titanium and silicon, as stated in the report of Kozo Tanabe "Catalyst," Vol. 17, No. 3, page 72 (1975), has been widely known as a solid acid. It exhibits conspicuous acidity not found in either of the component oxides thereof and possesses a large surface area.

The $TiO_2$—$SiO_2$ is not a mere mixture of titanium dioxide with silicon dioxide but is a product which is inferred to manifest the peculiar physical attributes mentioned above because titanium and silicon are combined to form the so-called binary type oxide. Further, the $TiO_2$—$ZrO_2$, $TiO_2$—$P_2O_5$, $TiO_2$—$SiO_2$—$ZrO_2$, $TiO_2$—$SiO_2$—$P_2O_5$, $TiO$ —$ZrO_2$—$P_2O_5$, and $TiO_2$—$SiO_2$—$ZrO_2$—$P_2O_5$ are characterized as composite oxides possessing the same qualities as $TiO_2$—$SiO_2$.

The composite oxides, on analysis by the X-ray diffraction, are found to possess an amorphous or substantially amorphous microstructure.

The mechanism which is responsible for the outstanding activity the catalyst of this invention manifests in ozone decomposition and deodorization particularly at low temperatures has not been fully elucidated. It is, however, considered that the various properties of the composite oxides produce desirable effects on their activity in ozone decomposition and deodorization. It is further considered that the composite oxide, by addition thereto of any of such elements as manganese, iron, nickel, cobalt, silver, platinum, palladium, and rhodium or the compounds thereof, are enabled to manifest their activity in ozone decomposition more effectively.

The $TiO_2$—$SiO_2$, $TiO_2$—$ZrO_2$, $TiO_2$—$P_2O_5$, $TiO$—$SiO$—$ZrO_2$, $TiO_2$—$SiO_2$—$P_2O_5$, $TiO_2$—$ZrO_2$—$P_2O_5$ and $TiO_2$—$SiO_2$—$ZrO_2$—$P_2O_5$ one of which is selected to constitute the component A of the catalyst of this invention are desired to have a surface area exceeding 30 m$^2$/g, preferably falling in the range of 100 to 250 m$^2$/g.

The component A of the catalyst brings about better results when it has a percentage composition such that the $TiO_2$ accounts for a proportion in the range of 20 to 95 mol% and the $SiO_2$, $ZrO_2P_2O_5$, or the sum of $SiO_2$ and $ZrO_2$, that of $SiO_2$ and $P_2O_5$, that of $ZrO_2$ and $P_2O_5$, or that of $SiO_2$, $ZrO_2$, and $P_2O_5$ accounts for a proportion in the range of 5 to 80 mol% (invariably based on the sum of $TiO_2$ + $ZrO_2$+$SiO_2$ +$P_2O_5$ taken as 100 mol%), preferably the former oxide accounts for a proportion in the range of 30 to 90 mol% and the latter oxide for a proportion in the range of 10 to 70 mol%.

The catalyst of this invention is preferred to have a composition wherein the component B contains at least one element for a proportion in the range of not more than 150 parts by weight, preferably 0 01 to 150 parts by weight, more preferably 10 to 60 parts by weight where the element to be selected is manganese (Mn), silver (Ag), iron (Fe), cobalt (Co), or nickel (Ni) as oxide or in the range of not more than 10 parts by weight, preferably 0.01 to 10 parts by weight, more preferably 0 2 to 5 parts by weight where the element is platinum (Pt), palladium (Pd), or rhodium (Rh) as metal, respectively based on 100 parts of the component A as composite oxide. From the point of activity in ozone decomposition and durability of the catalyst, it is preferred to use manganese oxides, more preferably beta-form manganese oxide, or it is preferred to use palladium as the component B.

If the catalyst component B falls outside the aforementioned range, then the produced catalyst is deficient in oxidative activity. If any of the noble metals such as platinum, palladium, or rhodium is used in an unduly large amount, cost of raw materials is high and the effect to be manifested is not proportionately increased.

In the preparation of the $TiO_2$—$SiO_2$ for use in the present invention, the titanium source may be selected from among inorganic titanium compounds such as titanium chloride and titanium sulfate and organic titanium compounds such as titanium oxalate and tetraisopropyl titanate and the silicon source from among inorganic silicon compounds such as colloidal silica, water glass, and silicon tetrachloride and organic silicon compounds such as tetraethyl silicate. Some of the raw materials enumerated above may contain a minute amount of extraneous substance. Preferably, the preparation of the $TiO_2$—$SiO_2$ is attained by any of the following methods.

1) A method which comprises mixing titanium tetrachloride with silica sol, adding ammonia to the resulting mixture thereby inducing precipitation, separating and washing the resulting precipitate, drying the washed precipitate, and calcining the dry precipitate at a temperature in the range of 300° to 650° C., preferably 350° to 600° C.

2) A method which comprises adding an aqueous sodium silicate solution to titanium tetrachloride, causing them components to react with each other and give rise to a precipitate separating and washing the precipitate, drying the washed precipitate, and calcining the dry precipitate at a temperature in the range of 300° to 650° C, preferably 350° to 600° C.

3) A method which comprises adding ethyl silicate ($C_2H_5O$ )$_4$Si to a water-alcohol solution of titanium tetrachloride thereby causing hydrolysis and consequent precipitation, separating and washing the resulting precipitate, drying the washed precipitate, and calcining the dry precipitate at a temperature in the range of 300° to 650° C., preferably 350° to 600° C.

4) A method which comprises adding ammonia to a water-soluble solution of titanium oxygen chloride (TiOCl ) and ethyl silicate thereby giving rise to a precipitate, separating and washing the precipitate, drying the washed precipitate, and calcining the dry precipitate at a temperature in the range of 300° to 650° C., preferably 350 to 600° C.

Among in the preferred methods cited above, the method of (1) proves to be particularly desirable. Specifically, this method is carried out as follows: If the catalyst component B falls outside the aforementioned range, then the produced catalyst is low in oxidative activity in commercial use although it can be used. If any of the noble metals such as platinum, palladium, and rhodium is used in an unduly large amount, the cost of raw material is high and the effect to be manifested is not proportionately increased. Examples of the titanium source and the silicon source are weighed out in amounts to form a composite oxide consisting of $TiO_2$ and $SiO_2$ in a predetermined ratio, mixed in the form of an acidic aqueous solution or as a sol containing titanium and silicon in a concentration in the range of 1 to 100 g/liter, preferably 10 to 80g/liter as oxide, and then held at a temperature in the range of 10° to 100° C. The solution or sol is kept stirred and aqueous ammonia added dropwise thereto meanwhile as a neutralizing agent, for a period of 10 minutes to three hours until a coprecipitate composed of titanium and silicon is formed at a pH in the range of 2 to 10. This coprecipitate is separated by filtration, thoroughly washed, then dried at a temperature in the range of 80° to 200° C. for a period of 1 to 10 hours, and calcined at a temperature in the range of 300° to 650° C., preferably 350° to 600° C. for a period of one to 10 hours, preferably 2 to 8 hours, to yield to $TiO_2$—$SiO_2$.

The TiO —$ZrO_2$—$SiO_2$ is prepared by the same method as used for the preparation of the titanium and silicon. In this case, the zirconium source may be selected from among inorganic zirconium compounds such as zirconium chloride and zirconium sulfate and organic zirconium compounds such as zirconium oxalate. Specifically, by handling such a zirconium compound together with titanium tetrachloride or oxychloride suitably by the methods described above, the $TiO_2$—$ZrO_2$—$SiO_2$ can be easily prepared. The amount of zirconium to be present in this ternary composite oxide is desired to be not more than 30% by weight as $ZrO_2$, based on the total amount of the $TiO_2+ZrO_2+SiO_2$ The preparation of the $TiO_2$—$ZrO_2$ can be carried out in the same manner as described above.

For the preparation of the $TiO_2$—$P_2O_5$, the titanium source may be selected from among inorganic titanium compounds such as titanium chloride and titanium sulfate and organic titanium compounds such as titanium oxalate and tetraisopropyl titanate and the phosphorus source from among phosphorus compounds such as ammonium phosphate, phosphoric acid, and phosphorus pentoxide.

Desirably, the preparation of the $TiO_2$—$P_2O_5$ is carried out as follows.

Compounds selected severally from the aforementioned groups of typical examples of the titanium source and the phosphorus source are weighted out in amounts to form a composite oxide consisting of titanium and phosphorus in a predetermined ratio, stirred to give a mixture containing titanium and phosphorus in a concentration in the range of 1 to 100 g/liter, preferably 10 to 80 g/liter as oxide, and left aging at a temperature in the range of 10° to 100° C thereby giving rise to a precipitate. The precipitate is separated by filtration, thoroughly washed, then dried at a temperature in the range of 80° to 200° C., for one to 10 hours, and calcined at a temperature in the range of 300° to 800° C., preferably 350° to 600° C., for one to 10 hours, preferably 2 to 8 hours, to yield to $TiO_2$—$P_2O_5$.

The $TiO_2$—$SiO_2$—$P_2O_5$, $TiO_2$—$ZrO_2$—$P_2O_5$, and $TiO_2$—$SiO_2$—$ZrO_2$—$P_2O_5$ can be prepare by adopting the same method as described above.

From the $TiO_2$—$SiO_2$, $TiO_2$—$ZrO_2$, $TiO_2$—$P_2O_5$, $TiO_2$—$SiO_2$—$ZrO_2$, $TiO_2$—$SiO_2$—$P_2O_5$, $TiO_2$—$ZrO_2$—$P_2O_5$, or $TiO_2$—$SiO_2$—$ZrO_2$—$P_2O_5$, a final catalyst can be obtained by the following method. For example, the catalyst is obtained by mixing $TiO_2$—$SiO_2$ with a binder for molding such as starch, methyl cellulose, etc., kneading the resulting mixture with a suitable amount of water, molding the resulting blend in the form of pellets or a honeycomb, with an extrusion molder, drying the molded article at a temperature in the range of 50° to 120° C., and thereafter calcining the dry molded article at a temperature in the range of 300° to 800° C., preferably 350° to 600° C., for one to 10 hours, preferably 2 to 6 hours under a current of air.

Optionally, 5 to 90% by weight, preferably 10 to 60% by weight, of the aforementioned component A may be substituted with activated carbon for the purpose of enabling the catalyst of this invention to substantially improve its activity in deodorization and ozone decomposition to a greater extent.

For this replacement, commercially available activated carbon can be employed. It may be used in a chemically or physically modified form of the activated carbon.

In the catalyst of this invention produced as described above, the component A is desired to account for a proportion in the range of 95 to 10% by weight and the activated carbon for a proportion in the range of 5 to 90% by weight.

From the component A, i.e. the $TiO_2$—$SiO_2$, $TiO_2$—$ZrO_2$, $TiO_2$—$SiO_2$—$ZrO_2$, etc. prepared as described above, a final deodorant article can be obtained by the following method. For example, the deodorant is produced by thoroughly mixing $TiO_2$—$SiO_2$ powder with activated carbon optionally further with a molding aid, blending the resulting mixture with a suitable amount of water, molding the resulting blend into an article of desired shape, then drying the article, and calcining the dry shaped blend when necessary. Though activated carbon is generally used in the form of powder, it may be used partly in the form of short fibers. The molding can be effected by any of the various known methods such as compression molding and extrusion molding.

The drying of the shaped composite article is effected at a temperature in the range of 50° to 200° C. and the calcining step is desirably carried out in a non-oxidizing atmosphere because the activated carbon is flammable. When the flammable substance is present in a low concentration, this calcination may none the less be carried out in the air.

The calcination is performed at a temperature in the range of 200° to 600° C., preferably 200° to 400° C., for a period of 1 to 10 hours, preferably 2 to 8 hours. When the calcination is not required, it can be omitted rather advantageously. Though the calcination performed at high temperatures results in improvement of the strength of the shaped composite article, it has the possibility of decreasing the specific surface area of the deodorant and lowering the deodorizing ability thereof.

The catalyst of the present invention which comprises the component A and the activated carbon may additionally incorporate therein a carrier such as alumina, silica, etc. or some other known deodorant.

The conversion of the component A to a final catalyst by the addition thereto of manganese, iron, nickel, cobalt, silver, platinum, palladium, or rhodium is effected by impregnating the shaped article of component A with an aqueous solution of the salt of the metal, drying and calcining the dry shaped article.

Alternatively, this conversion may be accomplished by adding the aqueous solution of metal salt in conjunction with a molding aid to the component A powder, kneading them, and molding the resulting blend.

Further, the catalyst of this invention permits additional use of a carrier. Examples of the material usable for the carrier are alumina, silica, silica-alumina, bentonite, diatomaceous earth, silicon carbide, titania, zirconia, magnesia, cordierite, mullite, pumice, activated carbon, and inorganic fibers. The combination of the catalyst with the carrier can be effected, for example, by preparing a slurry comprising the component A and other components of the catalyst and impregnating granular silicon carbide with the slurry thereby depositing the catalyst on the carrier. Other methods available for the production of the catalyst of this invention would be apparent to those skilled in the art.

The acceptable shapes of the catalyst article include not only the pellets and the honeycombs mentioned above but also cylinders, tubes, plates, ribbons, corrugated sheets, pipes, doughnuts, lattices, and monolithic shapes. It is preferred to use the honeycomb form having a nominal diameter of penetration pores in the range of 0.7 to 3mm, wall thickness of cells in the range of 0.2 to 0 5mm, and aperture ratio thereof not less than 50%, preferably in the range of 50 to 80%. In case of using a deodorizing catalyst, the space availability of an ozone decomposition apparatus is also often limited Therefore, the reactor for catalyst is required to be small one. In any case it is desirable to avoid choking the catalyst bed with dust containing treated gas, or to avoid loss of pressure and to maintain a high activity of the catalyst. All of these requirements are satisfied by using a honeycomb catalyst as mentioned above. If the nominal diameter of penetration pore of catalyst is less than 0.7mm, not only loss of pressure but, choking of the catalyst bed tends to occur. If the diameter is above 3mm, it is not preferable to cause decreasing a ratio of ozone decomposition or deodorization on account of decreasing a geometric surface area. It is the same reason why the aperture ratio is required to be more than 50%.

The starting material for the component B which is used in combination with the component A in the catalyst of the present invention can be suitably selected from among oxides, hydroxides, inorganic acid salts, and organic acid salts, particularly ammonium salts, oxalates, nitrates, sulfates, and halogenates. Even when other binary through quaternary composite oxide is used as the component A, the deposition of the component B on a carrier is effected in the same manner as the $TiO-SiO_2$ composite oxide.

The deodorizing catalyst contemplated by the present invention can be used for the treatment of any of various foul gases emanating from food storages, garbage dumps, septic tanks, sewage disposal plants, trash incinerators, cleaning shops, printing shops, painting shops, and chemical plants in general.

As examples of the component of offensive odor, there can be cited hydrogen sulfide, methyl sulfide, methyl mercaptan, methyl disulfide, ammonia, methylamine, dimethylamine, trimethylamine, ethylamine, diethylamine, triethylamine, isobutylamine, pyridine, acetone, methylethyl ketone, butyric acid, acetaldehyde, acrolein, phenol, benzene, xylene, toluene, and butenes. Gases containing these substances can be substantially completely deodorized by the method of this invention.

In the ozone-containing gas to be effectively treated by the catalyst of the present invention, the ozone concentration is roughly in the range of 0.01 to 10,000 ppm, though not critically.

The ozone decomposing agent of the present invention can be used for both gases and aqueous solutions containing ozone. The use of this agent is generally accomplished by passing a gas or solution under treatment through a bed packed with the ozone decomposing agent. The space velocity of the gas or solution for this passage generally falls in the range of 1,000 to 100,000 $hr^{-1}$, preferably 3,000 to 50,000 $hr_{-1}$.

The method, which uses packed beds of the ozone decomposition agent of this invention and packed beds of the conventional ozone decomposing agent in a multistage system brings about highly desirable results When a bed of activated carbon is used for the removal of ozone from a waste gas containing ozone in a high concentration, for example, the operation is hardly feasible because the bed may possibly encounter ignition and explosion and undergo heavy pulverization When a bed packed with the ozone decomposing agent of the present invention is set up on the upstream side of the path for the flow of the waste gas under treatment, the system enables the ozone concentration of the waste gas to be lowered in the former bed and permits the remaining ozone in the gas to be further removed in the latter activated carbon catalyst bed.

The deodorization of a foul gas by the use of the catalyst of this invention is accomplished by a method which comprises continuously introducing ozone at a prescribed rate into the foul gas containing a component of offensive odor and passing the resulting mixed gas over a bed of the catalyst set up on the downstream side in the path for the flow of the gas under treatment thereby effecting catalytic removal of the component of offensive odor from the gas under treatment. The concentration of the ozone introduced as described above into the foul gas is determined by the attributes and concentration of the component of offensive odor in the gas, other reaction conditions such as, for example, the reaction temperature, the kind of the catalyst, and the amount of the catalyst. This concentration is desired to fall in the range of 0.5 to 1,000 mols, preferably 1 to 10 mols, per mol of the component of offensive odor.

The reaction temperature is in the range of $-10°$ to $400°$ C., preferably $0°$ to $300°$ C. The space velocity is in the range of 1,000 to 100,000 $hr^{-1}$, preferably 3,000 to 50,000 $hr^{-1}$.

Alternatively the deodorization of a foul gas by the present invention may be attained by a method which enables the deodorizing effect to be maintained for a long period by alternately repeating the first step of deodorizing the foul gas by removing the catalyst bed having adsorbed thereon a component of offensive odor from the gas stream and the second step of intermittently introducing ozone into the thus degenerated bed of catalyst thereby decomposing the adsorbate and regenerating the catalyst bed. The salient feature of this method resides in the fact that the introduction of ozone into the foul gas in motion of the purpose of regenerating the degenerated adsorbent can be effected without interrupting the flow of the gas under treatment. The ozone thus introduced fulfills the role of removing the component of offensive odor from the gas under treatment and, at the same time, removing the adsorbate from the catalyst bed by decomposition. Unlike the conventional method for effecting deodorization by adsorption, the method under discussion does not require operate alternate peration or two columns of adsorbent beds, one for the adsorption and the other for desorption and regeneration. For this method, it suffices to use only one column is needed to effect simultaneous treatments of adsorption and regeneration.

The conditions for the adsorption and regeneration are selected, depending on the composition of the gas under treatment and the concentration of the component of offensive odor. They can be found by a simple test. For example, the space velocity of the gas relative to the adsorbent is desirably fixed in the range of 100 to 1000 hr$^{-1}$ and the concentration of ozone during the introduction thereof for regeneration in the range of 1 to 100 ppm. When the ozone concentration is lower than the range just mentioned, the regeneration is obtained with poor efficiency and traces of the foul order are detected. When the ozone concentration is higher than the range though the regeneration proceeds quickly, the unaltered portion of ozone passes into the ambient air and can also be readily detected.

The intermissions between and the durations of the intermittent introduction of ozone are desired to be each in the range of 30 minutes to 12 hours, per period of roughly one to 24 hours.

The intermittent introduction of ozone can be easily effected by programming the pattern of intermission in advance and combining an ozone generator and a timer in accordance with the programmed pattern.

Now, the present invention will be described more specifically below with reference to working examples. It should be noted, however, that this invention is not limited to these examples. The "ozone decomposition ratio" mentioned in the working examples was calculated by the following formula.

$$\frac{\text{Ozone concentration at outlet of catalyst bed}}{\text{Ozone concentration at inlet of catalyst bed}}$$

The "deodorization ratio" similarly mentioned was calculated by the following formula.

$$\frac{\text{Concentration at outlet of catalyst bed}}{\text{Concentration at inlet of catalyst bed}}$$

EXAMPLE 1

A composite oxide comprising titania and silica was prepared as follows. An aqueous sulfuric acid solution of titanyl sulfate having the following composition was used as a titanium source.

| TiOSO$_4$ (as TiO$_2$) | 250 g/liter |
|---|---|
| Total H$_2$SO$_4$ | 1,100 g/liter |

Separately, 28 liters of aqueous ammonia (NH$_3$, 25%) were added to 40 liters of water and 2.4 kg of Snowtex-NCS-30 (silica sol containing about 30% by weight of silica as SiO$_2$; product of Nissan Chemicals Industries Ltd.) were added further added thereto. To the resulting solution, a dilute titanium-containing aqueous sulfuric acid solution prepared by diluting 15.3 liters of the above aqueous sulfuric acid solution of titanyl sulfate with 30 liters of water was gradually added dropwise while under agitation to give rise to a coprecipitate gel. The resulting reaction mixture was left standing for 15 hours. The TiO$_2$—SiO$_2$ gel thus obtained was separated by filtration, washed with water, and then dried at 200° C. for 10 hours.

The dry TiO$_2$—SiO$_2$ gel was calcined under an atmosphere of air at 550° C. for six hours. The powder thus obtained had a composition of Ti$_2$:SiO$_2$=4:1 (molar ratio) and a BET surface area of 185m$^2$/g. The powder which will be referred to hereinafter as TS-1 was used to prepare an ozone decomposition catalyst as follows.

EXAMPLE 1A

In a kneader, 1.0 kg of the TS-1 powder was thoroughly mixed with 20 g of microcrystalline cellulose (produced by Asahi Chemical Industry Co., Ltd. and marketed under trademark designation of "Avicel") and a suitable amount of water. The resulting mixture was molded in the form of pellets 3.0 mm in diameter and 3.0 mm in length with an extrusion molding machine. The pellets were dried at 100° C. for 10 hours and then calcined under an atmosphere of air at 500° C. for six hours. Consequently, there was obtained a catalyst of formed TiO$_2$—SiO$_2$.

EXAMPLE 2

TiO$_2$—ZrO$_2$ was prepared as follows.

1.93 kg of zirconium oxychloride (ZrOCl$_2$8H$_2$O) was dissolved in 100 liters of cold water. In the resulting solution, 7.8 liters of an aqueous sulfuric acid solution of titanyl sulfate having the same composition as used in Example 1 was added and thoroughly mixed. The mixture thus formed was kept agitated at a temperature of about 30° C. and aqueous ammonia was gradually added thereto until the pH reached 7. The resulting reaction mixture was left standing at rest for 15 hours.

The TiO$_2$—ZrO$_2$ gel thus obtained was separated by filtration, washed with cold water, and then dried at 200° C for 10 hours. Then, the dry gel was calcined under an atmosphere of air at 550° C. for six hours. The powder thus obtained had a composition of TiO$_2$:ZrO$_2$=4:1 (molar ratio) and a BET surface area of 140 m$^2$/g. The powder thus obtained will be referred to hereinafter as TZ-1.

By using this TZ-1 and following the procedure of Example 1A, there was obtained a catalyst formed of TiO$_2$—ZrO$_2$.

EXAMPLE 3

TiO$_2$—SiO$_2$—ZrO$_2$ by following the procedures of Examples 1,1A and 2. The powder thus obtained had a composition of TiO$_2$: SiO$_2$ $_1$ : ZrO$_2$=80 : 16 :4 (molar ratio) and a BET surface area of 180m$^2$/g The powder thus obtained will be referred to hereinafter as TSZ-1.

By using this TSZ-1 and following the procedure of Example 1A, there was obtained a catlyst formed of TiO$_2$—SiO$_2$—ZrO$_2$.

EXAMPLES 4–6

Catalysts formed of TiO$_2$—SiO$_2$ were prepared by following the procedure of Example 1, except that the molar ratio of TiO$_2$/ /SiO$_2$ was varied.

The compositions and BET surface areas of the catalysts thus obtained were as shown in Table 1.

Control 1

A TiO$_2$ powder was prepared by following the procedure of Example 1, except that use of silica sol was omitted. The TiO$_2$ powder thus obtained had a BET surface area of 60 m$^2$/g. By using this powder and following the procedure of Example 1A, there was obtained a catalyst formed solely of TiO$_2$.

Control 2

A powder solely of SiO$_2$ containing no titanium was prepared by following the procedure of Example 1 The powder thus obtained had a surface area of 250 m$^2$/g By using this powder and following the procedure of Example 1A, there was obtained a catalyst formed solely of $SiO_2$.

Control 3

A $TiO_2$ powder and a $SiO_2$ powder obtained by following the procedures of Controls 1 and 2 were weighed out in amounts calculated to give a molar ratio of $TiO_2/SiO_2=4$ and thoroughly mixed. The mixed powder consequently obtained had a BET surface area of 90 $m^2/g$. By following the procedure of Example 1A, there was obtained a catalyst formed of the mixed powder.

EXAMPLE 7

The catalyts obtained in Examples 1-6 and Controls 1-3 were tested for ozone decomposition ratio as follows.

10.5 cc cf pellets of catalyst 3.0 mm in diameter and 3.0 mm in length were packed into a reaction tube made of Pyrex glass and having an inner diameter of 20 mm. Air containing 10 ppm of ozone was introduced to the bed of catalyst at a flow rate of 0.21 $Nm^3/hr$ (space velocity 20,000 $hr^{-1}$ with the reaction temperature varied in the range of 20° to 100° C., to find the ozone decomposition ratio.

The results were as shown in Table 2.

Example 8

In a kneader, 1.0 kg of the same TS-1 powder as used in Example 1 and an aqueous solution containing 0.366 kg of manganese nitrate, $Mn(NO_3)_2 6H_2O$, added thereto were thoroughly kneaded, with a suitable amount of water added thereto. By following the procedure of Example 1, the resulting mixture was molded in the form of pellets and the pellets were dried and calcined. Consequently, there was obtained a catalyst having a composition of TS-1 $MnO_2=90 : 10$ by weight ratio as oxide. X ray diffraction showed that manganese oxide obtained had the structure of beta-form manganese oxide. This catalyst was tested for ozone decomposition capacity by following the procedure of Example 7. The results were as shown in Table 3.

Examples 9-12

Catalysts were prepared by using the same TS-1 powder as used in Example 1 and following the procedure of Example 8, except that the component for addition to the component A was varied.

As catalyst sources, nitrates of iron, cobalt, nickel, and silver respectively were used.

The catalysts were tested for ozone decomposition capactiy by following the procedure of Example 7. The catalyst compositions and the results of the test were as shown in Table 3.

EXAMPLE 13

In an evaporation dish, 500 cc of the catalyst (pellets 3 mm in diameter and 3 mm in length ) formed of $TiO_2$—$SiO_2$ obtained in Example 1 and 140 ml of an aqueous platinum nitrate solution containing 3.5 g of platinumion (Pt) were thoroughly mixed for impregnation of the catalyst by the solution. Over a water bath, the impregnated catalyst was concentrated and then dried at 120° C. for five hours. Then, the dry catalyst was calcined in an electric oven at 400° C. for three hours.

The catalyst thus obtained was tested for ozone decomposition capacity by following the procedure of Example 7. The results were as shown in Table 3.

EXAMPLES 14-15

Catalysts were prepared by following the procedure of Example 13, excepting palladium and rhodium respectively were used in the place of platinum.

These catalysts were tested for ozone decomposition catalyst by following the procedure of Example 7. The catalyst compositions and the results of the test were as shown in Table 3.

It is noted from the results of Tables 2 and 3 that the catalysts of this invention provide highly efficient decomposition of ozone at low temperatures not exceeding 50° C., particularly at temperatures approximating to normal room temperature.

TABLE 1

| | $TiO_2/SiO_2$ catalyst | |
|---|---|---|
| | $TiO_2/SiO_2$ (molar ratio) | Specific area ($m^2/g$) |
| Example 4 | 9 | 175 |
| Example 1 | 4 | 185 |
| Example 5 | 1 | 230 |
| Example 6 | 0.42 | 210 |

TABLE 2

| | Ozone decomposition ratio (%) | | | | | |
|---|---|---|---|---|---|---|
| | Composition (mol ratio) | | | Reaction temperature (°C.) | | |
| | $TiO_2$ | $SiO_2$ | $ZrO_2$ | 20 | 50 | 100 |
| Example 1 | 80 | 20 | — | 72 | 77 | 83 |
| Example 2 | 80 | — | 20 | 70 | 74 | 81 |
| Example 3 | 80 | 16 | 4 | 73 | 78 | 85 |
| Example 4 | 90 | 10 | — | 71 | 75 | 81 |
| Example 5 | 50 | 50 | — | 73 | 75 | 83 |
| Example 6 | 30 | 70 | — | 70 | 73 | 77 |
| Control 1 | 100 | — | — | 20 | 35 | 46 |
| Control 2 | — | 100 | — | 0 | 0 | 3 |
| Control 3 | 80 | 20 | — | 17 | 30 | 36 |

TABLE 3

| | Ozone decomposition ratio (%) | | | |
|---|---|---|---|---|
| | Composition (weight ratio) | Reaction temperature (°C.) | | |
| | | 20 | 50 | 100 |
| Example 8 | TS-1:$MnO_2$ = 90:10 | 90 | 94 | 97 |
| Example 9 | TS-1:$Fe_2O_3$ = 90:10 | 89 | 93 | 96 |
| Example 10 | TS-1:CoO = 90:10 | 87 | 92 | 94 |
| Example 11 | TS-1:NiO = 90:10 | 85 | 92 | 95 |
| Example 12 | TS-1:AgO = 90:10 | 90 | 94 | 96 |
| Example 13 | TS-1:Pt = 99:1 | 94 | 97 | 99 |
| Example 14 | TS-1:Pd = 99:1 | 93 | 95 | 99 |
| Example 15 | Ts-1:Rh = 99:1 | 91 | 95 | 99 |

EXAMPLE 16

A composite oxide comprising titanium and phosphorus was prepared as follows. An aqueous sulfuric acid solution of titanyl sulfate having the following composition was used as a titanium source.

| $TiOSO_4$ (as $TiO_2$) | 250 g/liter |
|---|---|
| Total $H_2SO_4$ | 1,100 g/liter |

A titanium-containing aqueous sulfuric acid solution prepared by diluting 10 liters of the above aqueous sulfuric acid solution of titanyl sulfate with 50 liters of cold water was kept at 40° C. and, while under thorough agitation, 40 liters of an aqueous solution containing 4.13 kg of diammonium hydrogen phosphate were gradually added dropwise thereto, to give rise to a precipitate. The resulting reaction mixture was left standing at rest at 80° C. for six hours. The $TiO_2$—$P_2O_5$ gel consequently obtained was separated by filtration, washed with cold water, and then dried at 150° C. for 10 hours.

Subsequently, the dry gel was calcined under an atmosphere of air at 550° C. for six hours. The powder consequently obtained had a composition of $TiO_2$ : $P_2O_5 = 2 : 1$ (molar ratio) and a BET surface area of 70 m²/g This powder will be referred to hereinafter as TPI and was used to prepare an ozone decomposition catalyst as follows In a kneader, 1.0 kg of the TP-1 powder and 20 g of microcrystalline cellulose (produced by Asahi Chemical Industry Co., Ltd. and marketed under trademark designation of "Avicel") added thereto, were thoroughly mixed, with a suitable amount of water added thereto. The resulting mixture was molded in the form of pellets 3.0 mm in diameter and 3.0 mm in length with an extrusion molder. The pellets were dried at 100° C. for 10 hours and then calcined under an atmosphere of air at 500° C. for six hours. Consequently, there was obtained a catalyst formed of $TiO_2$—$P_2O_5$.

EXAMPLE 17-19

Catalysts formed of $TiO_2$—$P_2O_5$ were prepared by following the procedure of Example 1, TM except that the molar ratio of $TiO_2$—$P_2O_5$ was varied.

The compositions and the BET surface areas of the catalysts obtained were as shown in Table 4.

TABLE 4

| | $TiO_2$—$P_2O_5$ catalyst | |
|---|---|---|
| | $TiO_2/P_2O_5$ (molar ratio) | Specific area (m²/g) |
| Example 16 | 2 | 70 |
| Example 17 | 4 | 68 |
| Example 18 | 1 | 50 |
| Example 19 | 0.67 | 42 |

EXAMPLE 20

The catalysts obtained in Examples 16-19 and Control 1 were tested for ozone decomposition ratio as follows.

10.5 cc of pellets of catalyst 3.0 in diameter and 3.0 mm in length were packed in a reaction tube made of Pyrex glass and having an inner diameter of 20mm. Air containing 10 ppm of ozone was introduced to the catalyst bed at a flow rate of 0.21 Nm³/hr (space velocity 20,000 hr $^{-1}$, with the reaction temperature varied in the range of ° to 100° C., to find the ozone decomposition ratio. The results were as shown in Table 5.

TABLE 5

| | Ozone decomposition ratio (%) | | | |
|---|---|---|---|---|
| | Composition (molar ratio) $TiO_2/P_2O_5$ | Reaction temperature(°C.) | | |
| | | 25 | 60 | 100 |
| Example 16 | 2 | 65 | 74 | 79 |
| Example 17 | 4 | 63 | 72 | 77 |
| Example 18 | 1 | 52 | 63 | 71 |
| Example 19 | 0.67 | 48 | 60 | 68 |
| Control 1 | -(only $TiO_2$) | 25 | 38 | 46 |

EXAMPLE 21

In a kneader, 1.0 kg of the same TP-1 powder as used in Example 16 and an aqueous solution containing 0.366 kg of manganese nitrate, $Mn(NO_3)_2 6H_2O$ added thereto were thoroughly mixed, with a suitable amount of water added thereto. By following the procedure Example 16, the resulting mixture was molded in the form of pellets and the pellets were dried and calcined. Consequently, there was obtained a catalyst having the composition of TP-1 $MnO_2 = 90 : 10$ by weight ratio as oxide The catalyst was tested for ozone decomposition capacity by following the procedure of Example 20 The results were as shown in Table 6.

EXAMPLES 22-25

Catalysts were prepared by using the same TP-1 powder as used in Example 16 and following the procedure of Example 21, excepting the component for addition to the component A was varied.

As catalyst sources, nitrates of iron, cobalt, nickel, and silver respectively were used.

The catalysts were tested for ozone decomposition capacity by following the procedure of Example 20. The catalyst compositions and the results of the test were as shown in Table 6.

Example 26

500 cc of the catalyst (pellets 3 mm in diameter and 3 mm in length) formed of $TiO_2$—$P_2O_5$ obtained in Example 16 and 140 ml of an aqueous platinum nitrate solution containing 3.5 g of platinum (Pt) were thoroughly mixed in an evaporation dish to effect impregnation of the catalyst with the solution. Over a water bath, the impregnated catalyst was concentrated and then dried at 120° C. for five hours. Then, the dry impregnated catalyst was calcined under an atmosphere of air at 400° C. for three hours.

The catalyst thus obtained had a composition of TP-1 : Pt $= 99 : 1.0$ (weight ratio).

This catalyst was tested for ozone decomposition capacity by following the procedure of Example 20. The results were as shown in Table 6.

EXAMPLE 27-28

Catalysts were prepared by following the procedure of Example 26, except that palladium and rhodium were respectively used in the place of platinum.

The catalysts were tested for ozone decomposition capacity by following the procedure of Example 20. The catalyst compositions and the results of the test were as shown in Table 6. It is noted from the data of Tables 5 and 6 that the catalysts of the present invention provide highly efficient decomposition of ozone at low temperatures not exceeding 60° C., particularly at low temperature approximating to normal room temperature.

TABLE 6

| | Ozone decomposition ratio (%) | | | |
|---|---|---|---|---|
| | Composition (weight ratio) | Reaction temperature (°C.) | | |
| | | 25 | 60 | 100 |
| Example 21 | TP-1:$MnO_2$ = 90:10 | 88 | 91 | 96 |
| Example 22 | TP-1:$Fe_2O_3$ = 90:10 | 87 | 90 | 96 |
| Example 23 | TP-1:CoO = 90:10 | 85 | 89 | 95 |
| Example 24 | TP-1:NiO = 90:10 | 82 | 89 | 95 |
| Example 25 | TP-1:$Ag_2O$ = 90:10 | 88 | 91 | 96 |
| Example 26 | TP-1:Pt = 99:1 | 94 | 97 | 99 |
| Example 27 | TP-1:Pd = 99:1 | 92 | 95 | 98 |
| Example 28 | TP-1:Rh = 99:1 | 90 | 94 | 98 |

Example 29

In a kneader, 10 kg of the TS-1 powder obtained in Example 1 and a suitable amount of water added thereto were thoroughly mixed. The resulting mixture was thoroughly blended in a blender. The homogeneous mixture thus obtained was molded in the form of lattice-shaped honeycombs having visible dimensions of 50 mm in length, 50 mm in width, and mm in length (0.3 mm in wall thickness and 1.4 mm in mesh) with an extrusion molder. The honeycombs were dried at ° C. for five hours and then calcined under an atmosphere of air at 300° C. for two hours. Consequently, there was obtained a deodorizing catalyst formed of TS-1H.

EXAMPLE 30

A catalyst formed of TZ-1H was prepared by using the TZ-1 obtained in Example 2 and following the procedure of Example 29.

EXAMPLE 31

A catalyst formed of TSZ-1H was prepared by using the TSZ-1 obtained in Example 3 and following the procedure of Example 29.

EXAMPLES 32-34

Catalysts formed of $TiO_2$—$SiO_2$ were prepared by following the procedure of Example 29, excepting the molar ratio of $TiO_2/SiO_2$ varied. The compositions and the BET surface areas of the catalysts thus obtained were as shown in Table 7.

TABLE 7

| | $TiO_2/SiO_2$ catalyst | |
|---|---|---|
| | $TiO_2/SiO_2$ (molar ratio) | Surface area ($m^2/g$) |
| Example 32 | 9 | 175 |
| Example 29 | 4 | 185 |
| Example 33 | 1 | 230 |
| Example 34 | 0.42 | 210 |

EXAMPLE 35

The catalysts obtained in Examples 29–34 were tested for deodorization ratio as follows.

250 ml of latticelike honeycombs of catalyst were packed in a reaction tube made of Pyrex glass. Steam-saturated air containing 5 ppm of trimethylamine or methyl mercaptan as a typical component of offensive odor was introduced to the catalyst bed at a flow rate of 5 $Nm^3/hr$ (space velocity of 20,000 $hr^{-1}$)

Ozone was introduced in a concentration of 20 ppm to the inlet side of the catalyst bed, with the reaction temperature at 5° C. After 500 hours' use of the catalyst bed required for stabilization of the catalyst activity, the catalyst was tested for deodorization ratio The results were as shown in Table 8.

TABLE 8

| | | Deodorization ratio (%) | |
|---|---|---|---|
| | Composition (molar ratio) $TiO_2$—$SiO_2$—$ZrO_2$ | Trimethyl-amine | Methyl mercaptan |
| Example 29 | 80:20:— | 92 | 89 |
| Example 30 | 80:—:20 | 90 | 89 |
| Example 31 | 80:16:4 | 92 | 89 |
| Example 32 | 90:10:— | 93 | 89 |
| Example 33 | 50:50:— | 92 | 85 |
| Example 34 | 30:70:— | 92 | 85 |

EXAMPLE 36

A catalyst having a composition of TS-1 $MnO_2=90:10$ by weight ratio as oxide was obtained by impregnating the lattice-like honeycombs of TS-1H of Example 29 with an aqueous manganese nitrate solution, drying the impregnated honeycombs, and then calcining them.

This catalyst was tested for deodorization capacity by following the procedure of Example 35. The results were as shown in Table 9. The ozone concentration in the outlet gas was less than 0.1 ppm.

EXAMPLE 37–43

Catalysts were prepared by following the procedure of Example 36, excepting the component for addition to the component A was varied.

Nitrates of iron, cobalt, nickel, silver, and platinum, and chlorides of palladium and rhodium were used as catalyst sources. The catalysts were tested for deodorization capacity by following the procedure of Example 35. The compositions of the catalysts and the results of the test were as shown in Table 9. The ozone concentrations in the outlet gases were invariably less than 0.1 ppm.

Controls 4–5

Catalysts were prepared by following the procedure of Example 36, excepting lattice-like honeycombs of activated alumina and lattice-like honeycombs of activated carbon were used in the place of TS-1H. The catalysts were tested for deodorization capacity by following the procedure of Example 35. The compositions of the catalysts and the results of the test were as shown in Table 9.

TABLE 9

| | | Deodorization ratio (%) | |
|---|---|---|---|
| | Composition (weight ratio) | Trimethylamine | Methyl mercaptan |
| Example 36 | TS-1:$MnO_2$ = 90:10 | 99 | 99 |
| Example 37 | TS-1:$Fe_2O_3$ = 90:10 | 95 | 98 |
| Example 38 | TS-1:CoO = 90:10 | 95 | 98 |
| Example 39 | TS-1:NiO = 90:10 | 95 | 97 |
| Example 40 | TS-1:AgO = 90:10 | 94 | 92 |
| Example 41 | TS-1:Pt = 99:1 | 93 | 91 |
| Example 42 | TS-1:Pd = 99:1 | 95 | 95 |
| Example 43 | TS-1:Rh = 99:1 | 94 | 91 |
| Control 4 | —$A_2O_3$:$MnO_2$ = 90:10 | 78 | 60 |
| Control 5 | Activated carbon: $MnO_2$ = 90:10 | 65 | 75 |

As shown in Table 8 and Table 9, the catalysts of the present invention permit deodorization to be effected with high efficiency at such a low temperature as 5° C.

EXAMPLE 44

In a kneader, 750 g of the TS-1 powder obtained in Example 1 and 250 g of a commercially available activated carbon were thoroughly mixed, with a suitable amount of water added thereto. The resulting mixture was thoroughly blended in a blender. The homogeneous mixture thus obtained was molded in the form of pellets 5.0 mm in diameter and 6.0 mm in length with an extrusion molder. The pellets were dried at 150° C. for two hours. Consequently there was obtained an ozone decomposing agent formed of $TiO_2$—$SiO_2$—C.

EXAMPLE 45

An ozone decomposing agent formed of $TiO_2$—$ZrO_2$—C was prepared by using the TZ-1 obtained in Example 2 and following the procedure of Example 44.

EXAMPLE 46

An ozone decomposing agent formed of $TiO_2$—$SiO_2ZrO_2$—C was prepared by using the TSZ-1 obtained in Example 3 and following the procedure of Example 44.

EXAMPLE 47-49

Ozone decomposing agents formed of $TiO_2$—$SiO_2$—C were prepared by following the procedure of Example 44, except that the weight ratio of $TiO_2$—$SiO_2$ to the activated carbon was varied. The compositions of the ozone decomposing agents thus obtained were as shown in Table 10.

Control 6

An ozone decomposing agent formed solely of activated carbon was prepared by following the procedure of Example 44, except that granular activated carbon was used in the place of the TS-1 powder.

EXAMPLE 50

The ozone decomposing agents obtained in Examples 44–49 and Control 6 were tested for ozone decomposition capacity as follows.

200 ml of pellets of the agent 5.0 mm in diameter and 6.0 mm in length were packed in a reaction tube made of Pyrex glass and having an inner diameter of 38 mm. Air containing 2,000 ppm of ozone and 2% of steam was introduced to the catalyst bed at a flow rate of 0.40 $Nm^3/hr$ (space velocity 2,000 $hr^{-1}$) at a reaction temperature of 20° C. The gas emanating from the catalyst bed was tested for ozone concentration.

The results obtained after 100 hours passage of the gas through the catalyst bed were as shown in Table 11.

TABLE 10

| Ozone decomposing agent of $TiO_2$—$SiO_2$—C |
|---|
| $TiO_2$—$SiO_2$:C (% by weight) |

| | |
|---|---|
| Example 47 | 90:10 |
| Example 44 | 75:25 |
| Example 48 | 50:50 |
| Example 49 | 40:60 |

TABLE 11

| Outlet ozone concentration (ppm) | |
|---|---|
| Example 44 | 0.5 |
| Example 45 | 0.8 |
| Example 46 | 0.4 |
| Example 47 | 1.2 |
| Example 48 | 1.0 |
| Example 49 | 1.5 |
| Control 6 | 3.4 |

EXAMPLE 51

In a kneader, 10 kg of the TS-1 powder obtained in Example 1 and 10 kg of commercially available activated carbon were thoroughly mixed, with a suitable amount of water added thereto. The resulting mixture was thoroughly blended in a blender. The homogeneous mixture thus obtained was molded in the form of lattice-like honeycombs having visible dimensions of 50 mm in length, 50 mm in width, and 20 mm in depth (0.7 mm in wall thickness and 3.0 mm in mesh) with an extrusion molder. The honeycombs were dried at 150° C. for five hours and then calcined under an atmosphere of air at 300° C. for two hours. Consequently, there was obtained a deodorant formed of $TiO_2$—$SiO_2$—C.

EXAMPLE 52

A deodorant formed of $TiO_2$—$ZrO_2$—C was prepared by using the TZ-1 obtained in Example 2 and following the procedure of Example 51.

EXAMPLE 53

A deodorant formed of $TiO_2$—$SiO_2$—$ZrO_2$—C was prepared by using the TSZ-1 obtained in Example 3 and following the procedure of Example 51.

EXAMPLES 54-56

Deodorants formed of $TiO_2$—$SiO_2$—C were prepared by following the procedure of Example 51, excepting the weight ratio of the $TiO_2$—$SiO_2$ and the activated carbon was varied. The compositions of the deodorants consequently obtained were as shown in Table 12.

Control 7

A deodorant formed solely of activated carbon was prepared by following the procedure of Example 51, except that powdered activated carbon was used in the place of the TS-1 powder.

EXAMPLE 57

The various deodorants obtained in Example 51–56 and Control 7 were tested for capacity for deodorization of a foul gas as follows. A deodorant was placed in a container having an inner volume of 2 liters. Air (20° C.) containing 300 ppm of ammonia or hydrogen sulfide was introduced to the deodorant. The deodorant covered with the air was left standing at rest. At intervals of 30 minutes, 60 minutes, and 90 minutes, the air was tested for residual ammonia or hydrogen sulfide concentration to determine deodorization ratio. The results of the test were as shown in Table 13.

TABLE 12

| Composition of $TiO_2$—$SiO_2$—C deodorant |  |
|---|---|
|  | $TiO_2$—$SiO_2$:C (% by weight) |
| Example 54 | 90:10 |
| Example 55 | 75:25 |
| Example 51 | 50:50 |
| Example 56 | 25:75 |

TABLE 13

| | Deodorization ratio (%) | | | | | |
|---|---|---|---|---|---|---|
| | Ammonia | | | Hydrogen sulfide | | |
| | After 30 min. | After 60 min. | After 90 min. | After 30 min. | After 60 min. | After 90 min. |
| Example 51 | 90 | 95 | ≈100 | 80 | 95 | ≈100 |
| Example 52 | 85 | 95 | ≈100 | 80 | 95 | ≈100 |
| Example 53 | 90 | 95 | ≈100 | 80 | 95 | ≈100 |
| Example 54 | ≈100 | ≈100 | ≈100 | 50 | 70 | 90 |
| Example 55 | 90 | 95 | ≈100 | 70 | 90 | 95 |
| Example 56 | 80 | 90 | 95 | 80 | 95 | ≈100 |
| Control 57 | 20 | 35 | 50 | 80 | 95 | ≈100 |

EXAMPLE 58

The various deodorants obtained in Examples 51, 54, 55, and 56 and Control 7 were tested for crush strength with an Instron tester The results were as shown in Table 14.

TABLE 14

| Crush strength (kg/cm$^2$) | |
| --- | --- |
| Example 51 | 8 |
| Example 54 | 12 |
| Example 55 | 10 |
| Example 56 | 5 |
| Control 7 | 1.5 |

EXAMPLE 59

A tube made of Pyrex glass was packed with the lattice-like honeycombs of catalyst TS-1H obtained in Example 29 so as to preclude the incoming gas from finding a short path. Air containing 5 ppm of trimethylamine as a typical component of offensive odor was continuously introduced at a flow rate of 2.5 Nm$^3$/hr to the catalyst bed at 25° C. After 10 hours' use of the catalyst bed, the gas at the outlet of the catalyst bed was analyzed to determine trimethylamine concentration. Then the flow of the gas was continued. After the catalyst bed was exhausted and the concentration of the component of offensive odor in the gas at the outlet of the catalyst bed roughly equalled the concentration at the inlet, introduction of ozone to the tube interior was started. The introduction of ozone was adjusted so that the ozone concentration in the gas would remain at 30 ppm. The ozone introduction was continued for five hours. At the end of the ozone introduction, the gas at the outlet of the catalyst bed was analyzed for ozone and trimethylamine contents. Thereafter, the ozone introduction was discontinued and the introduction of the gas containing the component of offensive odor was continued to effect degeneration of the catalyst bed for 10 hours. At the end of the degeneration, the 9as at the outlet of the catalyst bed was analyzed. Then, the same operation of intermittently introducing ozone to the exhausted catalyst bed as described above was repeated a total of 10 times After elapse of 10 hours, the gas at the outlet of the Catalyst bed was analyzed.

The analysis for trimethylamine was made by using a FID-fitted gas chromatography and that for ozone an ozone monitor. The results were as shown in Table 15.

EXAMPLE 60

The catalyst obtained in Example 59 was subjected to the procedure of Example 59, except that the temperature of the catalyst bed was kept at 0° C.

The results were as shown in Table 16.

EXAMPLE 61

The catalyst of TZ-1H obtained in Example 30 was tested for adsorption and regeneration by following the procedure of Examples 59 and 60. The results were as shown in Tables 15 and 16.

EXAMPLE 62

The catalyst of TSZ-1H obtained in Example 31 was tested for adsorption and regeneration by following the procedure of Examples 59 and 60. The results were as shown in Tables 15 and 16.

TABLE 15

Results of analysis of outlet gas of catalyst be performed at 25° C.

| | Outlet gas concentration after 10 hours' operation (ppm) Trimethylamine | Outlet gas concentration during first cycle of ozone introduction (ppm) | | Gas concentration after 10 cycles of regeneration (ppm) Trimethylamine |
| --- | --- | --- | --- | --- |
| | | Trimethylamine | Ozone | |
| Example 59 | ND | ND | 1.0 | ND |
| Example 61 | 2.0 | ND | 5.0 | 2.0 |
| Example 62 | 1.0 | ND | 3.0 | 1.0 |

ND: Not more than 0.1 ppm

TABLE 16

Results of analysis of outlet gas of catalyst bed performed at 0° C.

| | Outlet gas concentration after 10 hours' operation (ppm) Trimethylamine | Outlet gas concentration during first cycle of ozone introduction (ppm) | | Gas concentration after 10 cycles of regeneration (ppm) Trimethylamine |
| --- | --- | --- | --- | --- |
| | | Trimethylamine | Ozone | |
| Example 60 | ND | ND | 3.0 | ND |
| Example 61 | 1.0 | ND | 8.0 | 1.0 |
| Example 62 | 0.5 | ND | 6.0 | 0.5 |

ND: Not more than 0.1 ppm

EXAMPLE 63

A catalyst having a composition of TS-1 : MnO$_2$=90 : 10 in weight ratio as oxide was obtained by impregnating the lattice-like honeycombs of TS-1H obtained in Example 29 with an aqueous manganese nitrate solution, and drying and calcining the impregnated honeycombs. This catalyst was tested for adsorption and regeneration by following the procedure of Example 60, excepting the concentration of the introduced ozone was fixed at 20 ppm and the duration of the introduction was two hours. The results of the test were as shown in Table 17.

EXAMPLE 64

The catalyst obtained in Example 63 was tested for adsorption and regeneration by following the procedure of Example 63, excepting the catalyst bed temperature was fixed at 25° C. The results were as shown in Table 18.

EXAMPLES 65-71

Adsorbents were prepared by following the procedure of Example 63, excepting the component B for addition to the component A was varied.

As raw materials for the component B, nitrates of iron, cobalt, nickel, silver, and platinum and chlorides of palladium and rohdium were used.

The catalysts thus obtained were tested for adsorption and regeneration by following the procedure of Example 63 The catalyst compositions and the results of the test were as shown in Table 17.

EXAMPLE 72-78

The catalysts obtained in Examples 65-71 were tested for adsorption and regeneration by following the procedure of Example 64 The catalyst compositions and the results of the test were as shown in Table 18.

Controls 8-9

Catalyst were prepared by following the procedure of Example 63, except that lattice-like honeycombs of activated alumina and lattice-like honeycombs of activated carbon were used in the place of the TS-1H.

The catalysts were tested for adsorption and regeneration by following the procedure of Example 64. The catalyst compositions and the results of the test were as shown in Table 18.

EXAMPLE 81

A catalyst was prepared by following the procedure of Example 8, except that $TiO_2$—$SiO_2$ (composition of $TiO_2/$—$SiO_2=1$, molar ratio) obtained in Example 5 was used in place of TS-1. Thus there was obtained a catalyst having a composition of $TiO_2$—$SiO_2$: $MnO_2=90:10$ by weight ratio as oxide.

EXAMPLE 82

A catalyst was prepared by following the procedure of Example 8, except that $TiO_2$—$SiO_2$ (composition of

TABLE 17

| | | Results of analysis of outlet gas of adsorbent bed performed at 0° C. | | | |
|---|---|---|---|---|---|
| | | Outlet gas concentration after 10 hours' operation (ppm) | Outlet gas concentration during first cycle of ozone introduction (ppm) | | Gas concentration after 10 cycles of regeneration (ppm) |
| | Composition (weight ratio) | Trimethylamine | Trimethylamine | Ozone | Trimethylamine |
| Example 63 | TS-1:$MnO_2$ 90:10 | ND | ND | ND | ND |
| Example 65 | TS-1:$Fe_2O_3$ 90:10 | ND | ND | 1.0 | ND |
| Example 66 | TS-1:CoO 90:10 | ND | ND | 1.5 | ND |
| Example 67 | TS-1:NiO 90:10 | ND | ND | 1.1 | ND |
| Example 68 | TS-1:AgO 90:10 | ND | ND | 0.2 | ND |
| Example 69 | TS-1:Pt 99.5:0.5 | ND | ND | ND | ND |
| Example 70 | TS-1:Pd 99.5:0.5 | ND | ND | ND | ND |
| Example 71 | TS-1:Rh 99.5:0.5 | ND | ND | ND | ND |

ND: Not more than 0.1 ppm

TABLE 18

| | | Results of analysis of outlet gas of catalyst bed performed at 25° C. | | | |
|---|---|---|---|---|---|
| | | Outlet gas concentration after 10 hours' operation (ppm) | Outlet gas concentration during first cycle of ozone introduction (ppm) | | Gas concentration after 10 cycles of regeneration (ppm) |
| | Composition (weight ratio) | Trimethylamine | Trimethylamine | Ozone | Trimethylamine |
| Example 64 | TS-1:$MnO_2$ 90:10 | ND | ND | ND | ND |
| Example 72 | TS-1:$Fe_2O_3$ 90:10 | ND | ND | 0.5 | ND |
| Example 73 | TS-1:CoO 90:10 | ND | ND | 0.8 | ND |
| Example 74 | TS-1:NiO 90:10 | ND | ND | 0.6 | ND |
| Example 75 | TS-1:AgO 90:10 | ND | ND | 0.1 | ND |
| Example 76 | TS-1:Pt 99.5:0.5 | ND | ND | ND | ND |
| Example 77 | TS-1:Pd 99.5:0.5 | ND | ND | ND | ND |
| Example 78 | TS-1:Rh 99.5:0.5 | ND | ND | ND | ND |
| Control 8 | —$Al_2O_3$:$MnO_2$ 90:10 | 4.0 | 3.0 | 10.0 | 4.5 |
| Control 9 | Activited carbon:$MnO_2$ 90:10 | ND | 2.0 | ND | 4.0 |

ND: Not more than 0.1 ppm

EXAMPLES 79-80

Catalysts were prepared by following the procedure of Example 8, except that amount of manganese nitrate addition was varied. Thus there were obtained catalysts having compositions of TS-1 $MnO_2=80:20$ by weight ratio as oxide and that of TS-1: $MnO_0=70:30$ by weight ratio as oxide.

$TiO_2$—/$SiO_2=0.42$) obtained in Example 6 was used in place of TS-1. Thus there was obtained a catalyst having a composition of $TiO_2$—$SiO_2$: $MnO_2=90:10$ by weight ratio as oxide.

EXAMPLE 83-86

The catalysts prepared in Examples 79-82 were tested for the activity of ozone decomposition by following the procedure of Example 20. The reaction temperature was at 2° C. The results were as shown in Table 19.

TABLE 19

| | | Ozone decomposition ratio (%) | |
|---|---|---|---|
| | Catalyst used | Composition (weight ratio) | Ozone decomposition ratio (%) |
| Example 83 | Example 79 | TS-1:MnO$_2$ 80:20 | 90 |
| Example 84 | Example 80 | TS-1:MnO$_2$ 70:30 | 91 |
| Example 85 | Example 81 | TiO$_2$—SiO$_2$:MnO$_2$ 90:10 | 84 |
| Example 86 | Example 82 | TiO$_2$—SiO$_2$:MnO$_2$ 90:10 | 82 |

EXAMPLES 87-90

The catalysts prepared in Example 79-82 were tested for deodorizing activity by following procedure of Example 35, excepting 10.5 ml of pellets of catalysts were packed in a reaction tube made of Pyrex glass having an inner diameter of 20 mm, and steam saturated air containing ppm of trimethylamine and methyl mercaptan was introduced to the catalyst bed at a flow rate of 0.21 Nm$^3$/hr (space velocity of 20,000 hr$^{-1}$) at a reaction temperature of 2° C. The results obtained were as shown in Table 20.

TABLE 20

| | | Deodorization ratio (%) | | |
|---|---|---|---|---|
| | Catalyst used | Composition (weight ratio) | Tri-methyl-amine | Methyl-mer-captan |
| Example 87 | Example 79 | TS-1:MnO$_2$ 80:20 | 99 | 99 |
| Example 88 | Example 80 | TS-1:MnO$_2$ 70:30 | 99 | 99 |
| Example 89 | Example 81 | TiO$_2$—SiO$_2$:MnO$_2$ 90:10 | 93 | 94 |
| Example 90 | Example 82 | TiO$_2$—SiO$_2$:MnO$_2$ 90:10 | 94 | 96 |

EXAMPLES 91-92 AND CONTROL 10

The catalysts obtained in Examples 36, 42 and Control 4 were tested for durability as follows: In a reaction tube made of Pyrex glass, 250 cc of lattice-like honeycombs of catalyst were packed. Air containing 40% of relative humidity, and containing 5 ppm of ozone was introduced to the catalyst bed at a flow rate of 12.5Nm$^3$/hr (space velocity 50,000hr-1) at room temperature. Change of ozone decomposition ratio with time was tested for days. The results were shown in Table 21.

TABLE 21

| | Ozone decomposition ratio (%) with time | | | |
|---|---|---|---|---|
| Catalyst used | After 1 day | After 50 days | After 100 days | After 250 days |
| Example 91 Example 36 | 99.9 | 95.8 | 93.1 | 91.5 |
| Example 92 Example 42 | 99.9 | 94.3 | 91.2 | 90.7 |
| Control 10 Control 4 | 88.7 | 67.3 | 43.2 | 32.7 |

EXAMPLE 93

A composite oxide comprising titania and silica was prepared as follows. An aqueous sulfuric acid solution of titanyl sulfate having the following composition was used as a titanium source.

| TiOSO$_4$ (as TiO$_2$) | 250 g/liter |
|---|---|
| Total H$_2$SO$_4$ | 1,100 g/liter |

Separately, 280 liters of aqua ammonia (NH$_3$, 25%) was added to 400 liters of water and 24 kg of Snowtex-NCS-30 (silica sol containing about 30% by weight of silica as SiO$_2$; product of Nissan Chemicals Industries Ltd.) was added further added thereto. To the resulting solution, a titanium-containing aqueous sulfuric acid solution prepared by diluting 153 liters of the above aqueous sulfuric acid solution of titanyl sulfate with 300 liters of water was gradually added dropwise while under agitation to give rise to a co-precipitate gel. The resulting reaction mixture was left standing at rest for 15 hours. The TiO$_2$—SiO$_2$ gel thus obtained was separated by filtration, washed with water, and then dried at 200° C. for 10 hours.

The dry TiO$_2$—SiO$_2$ gel was calcined under an atmosphere of air at 550° C. for six hours. The powder thus obtained had a composition of TiO$_2$:SiO$_2$=4:1 (molar ratio) and a BET surface area of 185m$^2$/g The powder thus obtained was used to prepare deodorant formed of lattice-like honeycomb.

An aqueous solution containing 3.66 kg of manganese nitrate Mn(NO$_3$)$_2$6H$_2$O was added in 10 kg of this powder. And then the resulting mixture was thoroughly blended in a blender with a suitable amount of water added thereto. The homogeneous mixture thus obtained was molded in the form of lattice-like honeycombs having visible dimensions of 50 mm in length, 50 mm in width, and 100 mm in depth with an extrusion molder. The honeycombs were dried at 150° C. for five hours and then calcined under an atmosphere of air at 300° C. for two hours The honeycomb obtained had penetration pores 1 4mm in individual diameter of wall thickness of cells of 0.33 mm and the aperture ratio of this honeycomb was 64% There was obtained a catalyst formed of the honeycombs having a composition of TiO$_2$—SiO$_2$=90:10 by weight ratio as oxide.

EXAMPLE 94-95

Catalysts formed of lattice-like honeycombs were prepared by using the same composition as used in Example 93 and following the procedure of Example 93, excepting the form of catalysts were varied The diameter of penetration pores, wall thickness of cells, and aperture ratio of catalysts thus obtained were shown as follows.

| | Diameter penetration pores (mm) | Wall thickness of cells (mm) | Aperture ratio (%) |
|---|---|---|---|
| Example 94 | 2.3 | 0.42 | 70 |
| Example 95 | 1.0 | 0.25 | 63 |

EXAMPLE 96-98

The catalysts obtained in Examples 93-95 were tested for deodorization and loss of pressure at the time as follows.

250 ml of lattice-like honeycombs of catalyst were packed in a reaction tube made of Pyrex glass. Steam-saturated air containing 5 ppm of trimethylamine or methyl mercaptan as a typical component of offensive odor was introduced to the catalyst bed at a flow rate of 5 Nm$^3$/hr (space velocity of 20,000 hr$^{-1}$).

Ozone was introduced in a concentration of 20 ppm to the inlet side of the catalyst bed, with the reaction temperature at 5° C. After 500 hours' use of the catalyst bed required for stabilization of the catalyst activity, the catalyst was tested for deodorization ratio. The losses of pressure were tested at above-mentioned operating condition. The results were as shown in Table 22.

TABLE 22

| | Deodorization ratio (%) and loss of pressure (mmH$_2$O) deodorization ratio (%) | | | |
|---|---|---|---|---|
| Catalyst used | Tri-methyl-amine | Methyl mer-captan | Pressure drop (mmH$_2$O) | Linear velocity (m/sec) |
| Example 96 | Example 93 | 99 | 99 | 20 | 0.87 |
| Example 97 | Example 94 | 95 | 98 | 7 | 0.79 |
| Example 98 | Example 95 | 99 | 99 | 39 | 0.89 |

What claimed is:

1. A method for the purification of an ozone-containing gas, which comprises passing said ozone-containing gas through a bed of a catalyst consisting of a component A composed of 95 to 10% by weight of a composite oxide and between 5 and 90% by weight of activated carbon said composite oxide comprising 20 to 95 mol% of (a) TiO$_2$ and 5 to 80 mol% of (b) at least one oxide selected from the group consisting of SiO$_2$, ZrO$_2$ and P$_2$O$_5$.

2. A method of according to claim 1, wherein said component A is selected from the group consisting of TiO$_2$—SiO$_2$, TiO$_2$—ZrO$_2$, TiO$_2$—P$_2$O$_5$, TiO$_2$—SiO$_2$—ZrO$_2$, TiO$_2$—SiO$_2$—P$_2$O$_5$, TiO$_2$—ZRO$_2$—P$_2$O$_5$, and TiO$_2$—SiO$_2$—ZrO$_2$—P$_2$O$_5$.

3. A method for the purification of an ozone-containing gas, which comprises passing said ozone-containing gas through a bed of the catalyst consisting of a component A composed of 95-10% by weight of a composite oxide containing (a) titanium and (b) at least one element selected from the group consisting of silicon, zirconium, and phosphorus, between 5 and 90% by weight of activated carbon, and a component B composed of at least one element selected from the groups consisting of manganese, iron, cobalt, nickel, silver, platinum, palladium, and rhodium, wherein the amount of said component B for a proportion in the range of not more than 150 by weight of oxide where said element selected if manganese, iron, cobalt, nickel or silver or in the range of not more than 10 parts by weight as metal where said element is platinum, palladium, or rhodium, respectively based on 100 parts by weight of said component A as oxide, thereby effecting decomposition of the ozone in said gas.

4. A method for the purification of a gas containing a component of offensive odor, selected from the group consisting essentially of hydrogen sulfide, methyl sulfide, methyl mercaptan, methyl disulfide, ammonia, methylamine, dimethylamine, trimethylamine, ethylamine, diethylamine, triethylamine, isobutylamine, pyridine, acetone, methylethylketone, butyric acid, acetaldehyde, acrolein, phenol, benzene, xylene, toluene, and butenes, which comprises combining said gas with ozone to a level of 1 to 10 mol per mol of component to offensive odor and passing the resultant mixed gas through a bed of a catalyst comprising a component A composed of 95 to 10% by weight a composite oxide containing (a) 20 to 95 mol% of TiO$_2$, and (b) 5–80 mol% of at least one element selected from the group consisting of silicon, zirconium, and phosphorus and a component B composed of at least one element selected from the group consisting of manganese, iron, cobalt, nickel, silver, platinum, palladium, and rhodium, wherein the amount of said component B for a proportion is in the range of not more than 150 parts by weight as oxide where said element selected is manganese, iron, cobalt, nickel, or silver or in the range of not more than 10 parts by weight as metal where said element is platinum, palladium, or rhodium, respectively based on 100 parts by weight of said component A as oxide thereby effecting decomposition and removal of said component of offensive odor by the ozone.

5. A method for the purification of a gas containing a component of offensive odor, selected from the group consisting essentially of hydrogen sulfide, methyl sulfide, methyl mercaptan, methyl disulfide, ammonia, methylamine, dimethylamine, trimethylamine, ethylamine, diethylamine, triethylamine, isobutylamine, pyridine, acetone, methylethylketone, butyric acid, acetaldehyde, acrolein, pheon, benzene, xylene, toluene, and butenes, which comprises combining said gas with ozone to a level of about 1 to 10 mol ozone per mol of components having offensive odor and passing the resultant mixed gas through a bed of the catalyst consisting of a component A composed of 95–10% by weight of a composite oxide containing (a) titanium and (b) at least one elment selected from the group consisting of silicon, zirconium, and phosphorus, between 5 and 90% by weight of activated carbon, and a component B composed of at least one element selected from the group consisting of manganese, iron, cobalt, nickel, silver, platinum, palladium, and rhodium, wherein the amount of said component B for a proportion in the range of not more than 150 by weight of oxide where said element selected if manganese, iron, cobalt, nickel or silver or in the range of not more than 10 parts by weight as metal where said element is platinum, palladium, or rhodium, respectively based on 100 parts by weight of said component A as oxide thereby effecting removal of said component of offensive odor by the ozone.

6. A method for the purification of an ozone-containing gas, which comprises passing said ozone-containing gas through a bed of the catalyst consisting of a component A composed of 95 to 10% by weight a composite oxide containing (a) 20 to 95 mol% TiO$_2$ and 5 to 80 mol% of (b) at least one element selected from the group consisting of silicon, zirconium, and phosphorus, and a component B composed of at least one element selected from the group consisting of manganese, iron, cobalt, nickel, silver, platinum, palladium, and rhodium, wherein the amount of said component B for a proportion is in the range of not more that 150 parts by weight of oxide where said element selected is manganese, iron, cobalt, nickel or silver or in the range of not more than 10 parts by weight as metal where said element is platinum, palladium or rhodium, respectively based on 100 parts by weight of said component A as oxide, thereby effecting decomposition of the ozone in said gas.

7. A method for the purification of a gas containing a component of offensive odor, selected from the group consisting essentially of hydrogen sulfide, methyl sulfide, methyl mercaptan, methyl disulfide, ammonia, methylamine, dimethylamine, trimethylamine, ethylamine, diethylamine, triethylamine, isobutylamine, pyridine, acetone, methylethylketone, butyric acid, acetaldehyde, acrolein, phenol, benzene, xylene, toluene, and butenes, which comprises i) deodorizing said gas by passing it through a bed of catalyst comprising a component consisting of a component A composed of a composite oxide containing (a) titanium, and (b) at least one element selected from the group consisting of silicon, zirconium, and phosphorus and a component B composed of at least one element selected from the group consisting of manganese, iron, cobalt, nickel, silver, platinum, palladium, and rhodium, wherein the amount of said component B for a proportion is in the range of not more than 150 parts by weight as oxide where said element selected is manganese, iron, cobalt, nickel, or silver or in the range of not more than 10 parts by weight as metal where said element is platinum, palladium, or rhodium, respectively based on 100 parts by weight of said component A as oxide ii) removing said catalytic bed from the gas stream the bed having absorbed thereon said component of offensive odor and iii) introducing ozone intermittently into the catalyst bed while removed from the gas stream to decompose said component of offensive odor and regenerate said bed.

8. A method according to claim 7, wherein said component A is selected from the group consisting of $TiO_2$—$SiO_2$, $TiO_2$—$ZrO_2$, $TiO_2$—$P_2O_5$, $TiO_2$—$SiO_2$—$ZeO_2$, $TiO_2$—$SiO_2$—$P_2P_5$, $TiO_2$—$ZrO_2$—$P_2O_5$, and $TiO_2$—$SiO_2$—$ZrO_2$—$P_2O_5$.

9. A method according to claim 8, wherein said component A comprises 20 to 95 mol% of $TiO_2$ and 5 and 80 mol% of at least one oxide selected from the group consisting of $SiO_2$, $ZrO_2$ and $P_2O_5$.

10. A method according to claim 7 wherein said catalyst consists of a component A composed of 95-10% by weight of an oxide containing (a) 20 to 95 mol% by weight of an oxide containing (a) 20 to 95 mol% $TiO_2$ and (b) 5-80 mol% of the oxide of at least one element selected from the group consisting of silicon, zirconium, and phosphorus, between 5 and 95% by weight of activated carbon and a component B composed of at lest one element selected from the group consisting of manganese, iron, cobalt, nickel, silver, platinum, palladium, and rhodium, wherein the amount of said component B for a proportion in the range of not more than 150 parts by weight as oxide where said element selected is manganese, iron, cobalt, nickel, or silver or in the range of not more than 10 parts by weight as metal where said element is platinum, palladium, or rhodium, respectively based on 100 parts by weight of said component A as composite oxide.

* * * * *